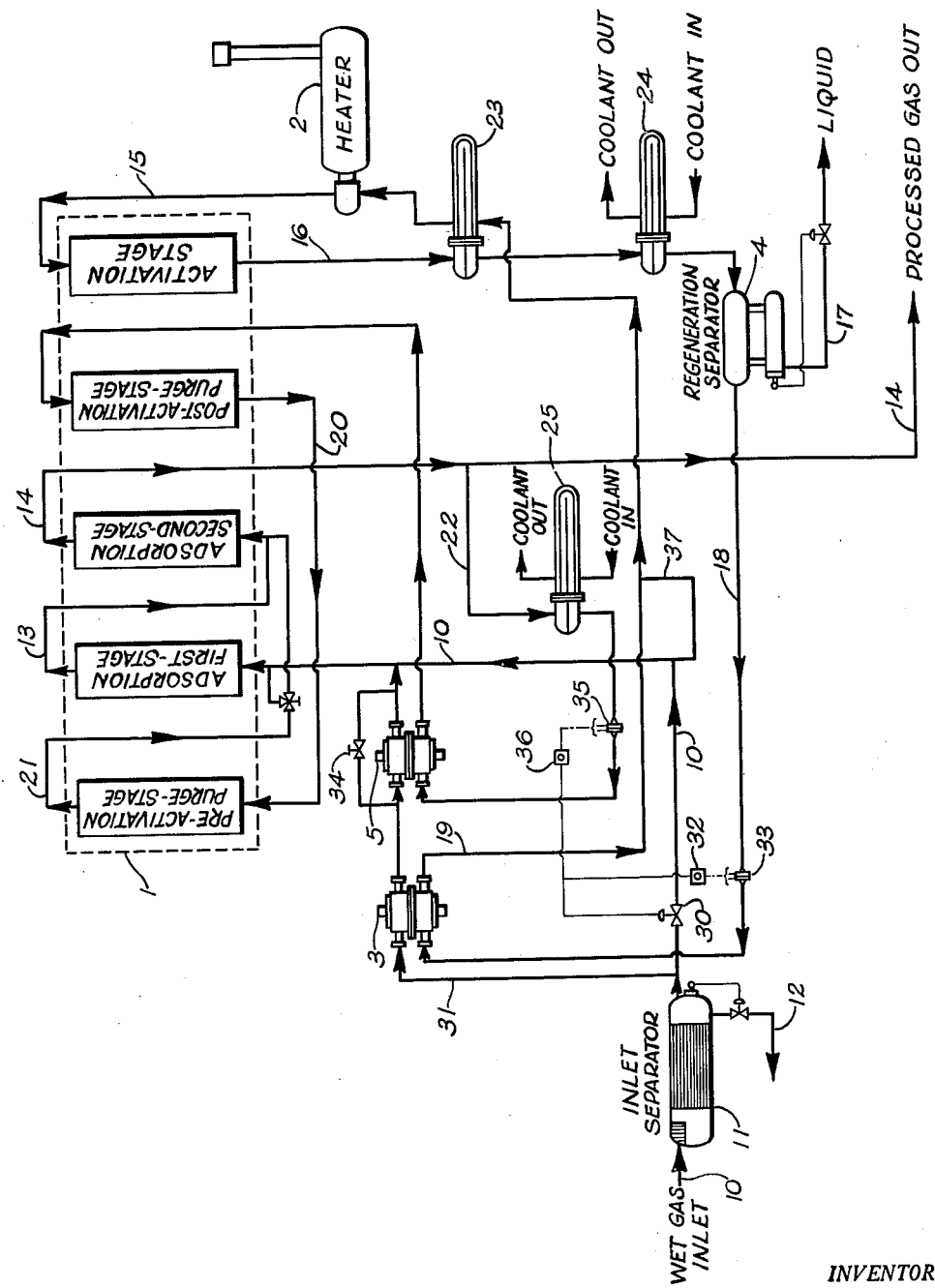

United States Patent Office 3,080,692
Patented Mar. 12, 1963

3,080,692
ADSORPTION PROCESS AND APPARATUS FOR GAS DEHYDRATION AND HYDROCARBON RECOVERY
Edwin Hale Staley and Alex W. Francis, Jr., Tulsa, Okla., assignors to National Tank Company, Tulsa, Okla., a corporation of Nevada
Filed July 11, 1960, Ser. No. 42,045
6 Claims. (Cl. 55—18)

This invention relates to the dehydration of gas and the recovery of condensable hydrocarbons. More specifically, the invention relates to processing natural gas, at its source, prior to transmission of the gas through pipelines, in order to remove moisture and condensable hydrocarbons.

For the purposes of this invention the flow of gas to be processed will be known as the flow, or the main, stream. The flow, or main, stream of natural gas from a wellhead is always saturated, or partially saturated, with moisture in accordance with its origin, its pressure and temperature. If the gas is transmitted with this moisture in it, it may severely corrode the metal pipeline through which it is transmitted. Further, this moisture at lowered temperatures may form hydrates which will clog the pipelines and valves. One common practice involves conducting wet gas through large cylinders filled with adsorbent material. Another common practice involves conducting the wet gas through a first zone through which relatively small cylinders filled with adsorbent material are cyclically passed. A second zone is established through which activation gas is recycled to remove the water and condensable hydrocarbons adsorbed from the flow, or main, stream in the first zone. A third zone may be established between the first two zones in order to purge the reactivated adsorbent of the heat from the activation zone and the relatively high concentration of moisture and hydrocarbons in the closed activation circuit.

The gas in the activation stage and the gas in the purge stage have been circulated by separate fans or blowers. The fans or blowers have been driven from electric or gas engines. The power, and the provisions for getting this power to the fans and blowers, is a significant expense.

A principal object of the present invention is to circulate gas in the activation circuit and drive gas through the purge circuit with power from the main flow stream.

Another object is to regulate the amount of power from the main flow stream applied to move the gases through both the activation and purge circuits and proportion the power utilized by each circuit.

The present invention contemplates passing the natural gas to be treated through one or more adsorption stages. An activation cycle is employed to recycle a captive activation gas through a heater, the activation stage of the adsorber and the condenser-separator. A first motor-compressor unit is employed to mechanically link the flow of natural gas to be treated to the flow of captive activation gas in driving the gas of the activation circuit with the power of the main flow stream of natural gas to be treated. A purging circuit is arranged to remove gas from the main stream after processing by the adsorption stage and pass the gas, in series, through stages on each side of the activation stage, between the activation stage and the adsorption stage and then return the gas to the main stream before the adsorption stage. A second motor-compressor unit is arranged to mechanically link the flow of natural gas to be treated to the flow of gas in the purge circuit in driving the gas of the purge circuit with the power of the main flow stream of natural gas to be treated.

The invention further contemplates the motor-compressor units having a portion of the main flow stream of natural gas to be processed diverted through their motor sections, in series. The diversion is regulated by a valve responsive to flow in one, or both, of the activation and purge circuits. Further, a second valve is arranged to divert a part of the flow diverted from the main flow stream around the motor section of the motor-compressor unit moving the gas in the purge circuit.

While any suitable type of adsorption apparatus may be employed to practice the process of the present invention, the process will be described as carried out by employing a rotary type of adsorber in which a plurality of elongated upright closed vessels containing adsorbent material are rotated directly in succession through the various stages of the adsorber. A representation of this type of adsorber is in the disclosure of U.S. Patent 2,799,-364 to Ernest B. Miller, issued July 16, 1957.

Other objects, advantages, and features of this invention will become more apparent to one skilled in the art upon consideration of the written specification, appended claims, and the attached drawing wherein is schematically illustrated a complete adsorption process in which the invention is embodied.

Basic Apparatus

In the drawing, one embodiment of apparatus and its arrangement for carrying out the method of the present invention is disclosed. The apparatus shown includes a five stage rotary adsorber 1, two stages of which are employed as adsorption stages, two stages of which are employed as purging stages, and one stage of which is employed as an activation stage. A heater 2 is employed to heat the activation gas in a closed circuit. A first motor-compressor 3 recirculates the activation gas through the activation stage. A condenser-separator 4 is employed to condense the moisture and condensable hydrocarbons contained in the recirculating activation gas after it is passed through the activation stage of the adsorber. A second motor-compressor 5 is employed to move the purging gas through the purging stages of the adsorber, in series.

Basic Processing

The wet gas being treated is delivered, at high pressure, from the usual compressor, or source of supply (not shown) to the first adsorption stage of the adsorber by means of a conduit 10. The gas passes through the inlet separator 11 from which free liquids are drawn off through conduit 12. The gas to be processed passes through the first adsorption stage where some of the moisture and condensable hydrocarbons are removed by the adsorbent material. From the first adsorption stage of the adsorber, the gas passes through conduit 13 to the second adsorption stage of the adsorber. After passing through the second adsorption stage, where additional moisture and condensable hydrocarbons are removed, the gas passes through conduit 14 to its point of delivery.

Reactivation

The captive activation gas is heated in the heater 2 to a temperature from 300 F. to 600 F., depending upon the moisture content of the gas to be treated and the type of hydrocarbons to be recovered, and, from the heater, passes through conduit 15 to the activation stage of the adsorber. The heated gas passes through the activation stage of the adsorber, desorbing the accumulated moisture and hydrocarbons from the adsorbent material in the activation zone. The heated gas, and the moisture and condensable hydrocarbons desorbed from the adsorbent material, pass through a conduit 16 to the condenser-separator 4, where the moisture and condensable hydrocarbons are condensed and separated. The water and condensable hydrocarbons are drained from the bottom of the separator by a suitable drain conduit 17.

From the condenser-separator 4, the now stripped activation gas passes through a conduit 18 to the motor-compressor 3 and is recirculated through a conduit 19 and back to the heater 2. This recirculation of the activation gas is continuous. The composition of the captive stream of gas in the activation system will build up gradually in terms of condensable vapors, composed chiefly of hydrocarbons, until the dewpoint of the captive gas stream reaches condenser temperature. Thereafter, the activation gas will yield as liquids all the condensable vapors desorbed in the activation stage of the adsorber.

Purge

The vessels which contain the adsorbent beds are rotated so that each vessel passes in succession through the various stages of the adsorber. As the vessels are moved through each stage, they are filled with the particular gas going through the stage and carry this gas into the next or succeeding stage in their rotary movement. This carrying of gas from one stage to the other by the vessels is called slippage.

In order to prevent slippage gas from the first adsorption stage, which would consist of the raw gas being treated, from being carried into the activation stage and diluting the recycling activation gas, a purge stage is interposed between the first adsorption stage and the activation stage and called the pre-activation purge stage. Also, in order to prevent the slippage gas from the activation stage, which is rich in condensable hydrocarbons, from being carried over into the second adsorption stage, where it would pass out of the adsorber with the outgoing stripped gas, a post-activation purge stage is interposed between the activation stage and the second adsorption stage.

The gas from the post-activation purge stage, which consists chiefly of slippage activation gas, is used as the purging medium for the pre-activation purge stage and passes from the post-activation purge stage through a conduit 20 into the pre-activation purge stage. The gas from the pre-activation purge stage passes through a conduit 21 and is discharged into conduit 10 and/or conduit 13 to join the flow of the raw gas being treated on its way to the adsorption stages of the adsorber.

A portion of the stripped raw gas flowing from the second adsorption stage of the adsorber is used as the purging medium for the purge stages and passes through the purging stages of the adsorber in series. The stripped gas from the conduit 14 is drawn off through conduit 22 to push the slippage gas from the activation stage through conduit 20 into the pre-activation purge stage. The gas from the pre-activation purge stage is then pushed into the gas being treated on its way into the adsorption stages. Motor-compressor 5 moves this gas along, utilizing the power of the main stream gas flow.

The employment of the two purging stages, as above outlined, provides for complete purging of the adsorbent material while preventing dilution of the activation gas and reduces loss of condensable hydrocarbons by slippage, thus greatly increasing the efficiency in operation of the adsorber. In addition, the use of the two purging steps, permits the pressure differential of the various stages to be controlled thus reducing the leakage across the seal between the stages.

Heat Exchange

The activation circuit must be cooled to condense the water and hydrocarbons desorbed from the desiccant passing through the activation stage. Some heat can be extracted from the gas in conduit 16 after the activation stage by passing this gas in heat exchange with the gas in conduit 19. Heat exchanger 23 carries out this function, conserving the heat of the activation circuit, and thus reducing the load on heater 2.

Exchanger 24 represents additional means of cooling which can be used on the gas of conduit 16. Any available cooling medium, such as water, can be used to reduce the temperature of the gas in conduit 16 until the desired condensation takes place.

Exchanger 25 represents a means similar to exchanger 24. Exchanger 25 reduces the temperature of the gas in conduit 22 as required to provide the proper purge gas for the two stages of purge.

Flow Control

Motor-compressors 3 and 5 power the activation and purge circuits. The motor sides of these units receive the main stream of conduit 10 in series as determined by the regulation of valve 30. Valve 30 is in conduit 10 and establishes a differential across itself to shunt a portion of the flow in conduit 10 through conduit 31 to power the motor units of motor-compressors 3 and 5.

Valve 30 is regulated by a control 32 which responds to the pressure differentials across orifice 33 in conduit 18. As the differential across orifice 33 varies, controller 32 regulates valve 30 to adjust the amount of the stream in conduit 10 delivered to conduit 31. Motor-compressors 3 and 5 thus have their speeds adjusted to maintain the differential across orifice 35.

A portion of the gas flowing in conduit 31 may be shuttled around motor-compressor 5 with adjustment of valve 34. In this way, the differential in speed between the two motor-compressors 3 and 5, required to meet the difference in capacities of the two circuits, can be controlled.

The flow in the purge circuit can be used as another element in the control of valve 30. An orifice 35 and controller 36 can be used to develop a control signal which may be combined in any way desired with the signal of controller 32.

Pressure Balance

The pressure of the main stream may differ from the pressure of the activation circuit as the concentration of water and hydrocarbons builds up in the activation circuit. Conduit 37 will equalize these pressures, controlled in any way desired.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:
1. In the removal of water vapor and condensable hydrocarbons from natural gas involving the contact of adsorbent material with a main flow stream of gas with resultant adsorption of the water and condensable hydrocarbons by the adsorbent material and the subsequent treatment of the adsorbent material with a heated reactivation agent to vaporize and remove the water and condensable hydrocarbons and thereby reactivate the adsorbent material for further contact with the main flow stream of natural gases;
   sequentially placing a series of beds of adsorbent material into at least one adsorption stage, a pre-activation purge stage, an activation stage, and a post-activation purge stage;
   continuously directing a flow of the gas to be treated under high pressure through the adsorption stage so the water and condensable hydrocarbons are removed by adsorption on the adsorbent material;
   continuously heating and recycling a flow of activation gas in a captive circuit through the activation stage to desorb the water and condensable hydrocarbons contained in the beds of adsorbent material as the beds are placed in the stage and reactivate the adsorbent material of the beds;

continuously directing a part of the gas treated in the adsorption stage serially through the post-activation purge stage and then through the pre-activation purge stage and then into the flow of the gas being treated as it flows to the adsorption stage;

mechanically linking the captive flow of reactivating gas and the flow of gas directed serially through the purge stages to the main flow stream of natural gas to transfer the power of the main flow stream simultaneously to the captive flow of gas and purge stage gas with mechanical motion;

continuously sensing the rate of flow of activation gas in the captive circuit;

and utilizing the rate of flow of activation gas to simultaneously control the mechanical linkage between main flow stream of natural gas and the captive flow of reactivating gas and the purge gas.

2. In the removal of water vapor and condensable hydrocarbons from natural gas involving the contact of adsorbent material with a main flow stream of gas with resultant adsorption of the water and condensable hydrocarbons by the adsorbent material and the subsequent treatment of the adsorbent material with a heated reactivation agent to vaporize and remove the water and condensable hydrocarbons and thereby reactivate the adsorbent material for further contact with the main flow stream of natural gases;

sequentially placing a series of beds of adsorbent material into at least one adsorption stage, a pre-activation purge stage, an activation stage, and a post-activation purge stage;

continuously directing a flow of the gas to be treated under high pressure through the adsorption stage so the water and condensable hydrocarbons are removed by adsorption on the adsorbent material;

continuously heating and recycling a flow of activation gas in a captive circuit through the activation stage to desorb the water and condensable hydrocarbons contained in the beds of adsorbent material as the beds are placed in the stage and reactivate the adsorbent material of the beds;

continuously directing a part of the gas treated in the adsorption stage serially through the post-activation purge stage and then through the pre-activation purge stage and then into the flow of the gas being treated as it flows to the adsorption stage;

mechanically linking the main flow stream of natural gas to the reactivating gas to transfer power of the main flow stream to the captive flow of gas with mechanical motion, and mechanically linking a predetermined proportion of the main flow stream of natural gas linked to the reactivating gas to the purge stage gas to transfer power of the main flow stream to the purge stage gas with mechanical motion.

3. In the removal of water vapor and condensable hydrocarbons from natural gas involving the contact of adsorbent material with a main flow stream of gas with resultant adsorption of the water and condensable hydrocarbons by the adsorbent material and the subsequent treatment of the adsorbent material with a heated reactivation agent to vaporize and remove the water and condensable hydrocarbons and thereby reactivate the adsorbent material for further contact with the main flow stream of natural gases;

sequentially placing a series of beds of adsorbent material into at least one adsorption stage, a pre-activation purge stage, an activation stage, and a post-activation purge stage;

continuously directing a flow of the gas to be treated under high pressure through the adsorption stage so the water and condensable hydrocarbons are removed by adsorption on the adsorbent material;

continuously heating and recycling a flow of activation gas in a captive circuit through the activation stage to desorb the water and condensable hydrocarbons contained in the beds of adsorbent material as the beds are placed in the stage and reactivate the adsorbent material of the beds;

continuously directing a part of the gas treated in the adsorption stage serially through the post-activation purge stage and then through the pre-activation purge stage and then into the flow of the gas being treated as it flows to the adsorption stage;

mechanically linking the main flow stream of natural gas to the reactivating gas to transfer power of the main flow stream to the captive flow of gas with mechanical motion;

mechanically linking a predetermined proportion of the main flow stream of natural gas linked to the reactivating gas to the purge stage gas to transfer power of the main flow stream to the purge stage gas with mechanical motion;

continuously sensing the rate of flow of activating gas in the captive circuit;

continuously sensing the rate of flow of treated gas serially through the purge stages;

and continuously adjusting the transfer of power from the main flow stream to the captive flow of gas and the purge stage gas in accordance with both the rate of flow of activating gas in the captive circuit and the rate of flow of treated gas through the purge stages.

4. An apparatus for removing water vapor and recovering condensable hydrocarbons from natural gas including, a series of beds of adsorbent material arranged to rotate directly in succession through an adsorption zone and a first purge zone and an activation zone and a second purge zone, a first circuit conducting natural gases through the adsorption zone, a second captive circuit arranged to continuously recycle a flow of gas through the reactivating zone while the gas is heated hot enough to vaporize the water and condensable hydrocarbons contained in the beds of adsorbent material in the zone and thereby reactivate the beds, a third circuit arranged to continuously direct a part of the gas which has been treated in the first circuit and within the adsorption zone through the purge zones in series and then back into the first circuit before the first circuit gas has flowed through the adsorption zone, means for mechanically transferring flow energy of the first circuit with a mechanical motion to the second and third circuits to simultaneously circulate the reactivating gas through the second circuit and the purge gas through the third circuit, means for condensing and recovering the water and condensable hydrocarbons from the heated activating gas in the second circuit after the gas has passed through the adsorbent material, and means for continuously sensing the rate of flow of activating gas in the captive circuit and applying the rate of flow to controlling the transfer of energy from the first circuit to the second and third circuits so as to maintain the flows through the second and third circuits at predetermined rates.

5. An apparatus for removing water vapor and recovering condensable hydrocarbons from natural gas including, a series of beds of adsorbent material arranged to rotate directly in succession through an adsorption zone and a first purge zone and an activation zone and a second purge zone, a first circuit conducting natural gases through the adsorption zone, a second captive circuit arranged to continuously recycle a flow of gas through the reactivating zone while the gas is heated hot enough to vaporize the water and condensable hydrocarbons contained in the beds of adsorbent material in the zone and thereby reactivate the beds, a third circuit arranged to continuously direct a part of the gas which has been treated in the first circuit and within the adsorption zone through the purge zones in series and then back into the first circuit before the first circuit gas has flowed through the adsorption zone, means for mechanically transferring a first portion of flow energy of the first circuit with a mechanical motion to the second circuit, and means for mechanically transferring a portion of the first portion of the flow energy of the first circuit with a mechanical motion to the third circuit.

6. An apparatus for removing water vapor and recovering condensable hydrocarbons from natural gas including, a series of beds of adsorbent material arranged to rotate directly in succession through an adsorption zone and a first purge zone and an activation zone and a second purge zone, a first circuit conducting natural gases through the adsorption zone, a second captive circuit arranged to continuously recycle a flow of gas through the reactivating zone while the gas is heated hot enough to vaporize the water and condensable hydrocarbons contained in the beds of adsorbent material in the zone and thereby reactivate the beds, a third circuit arranged to continuously direct a part of the gas which has been treated in the first circuit and within the adsorption zone through the purge zones in series and then back into the first circuit before the first circuit gas has flowed through the adsorption zone, a first motor-compressor between the first circuit and the second circuit to mechanically transfer flow energy between the first circuit and the second circuit, a second motor-compressor between the first circuit and the third circuit to mechanically transfer flow energy between the first circuit and the third circuit, a first flow meter arranged to respond to the flow rate of gas in the second circuit, a second flow meter arranged to respond to the flow rate of gas in the third circuit, and a controller arranged to respond to both flow meters to develop a control signal which is applied to by-pass gas of the first circuit around the motors of the two motor-compressors, whereby the flows in the second and third circuits are maintained at predetermined rates.

References Cited in the file of this patent

UNITED STATES PATENTS

| | | |
|---|---|---|
| 2,799,364 | Miller | July 16, 1957 |
| 2,957,544 | Baker | Oct. 25, 1960 |